June 10, 1952 — L. M. IBAÑEZ RODRIGUEZ — 2,599,782
CONTINUOUS CLARIFIER
Filed Oct. 3, 1947 — 2 SHEETS—SHEET 1
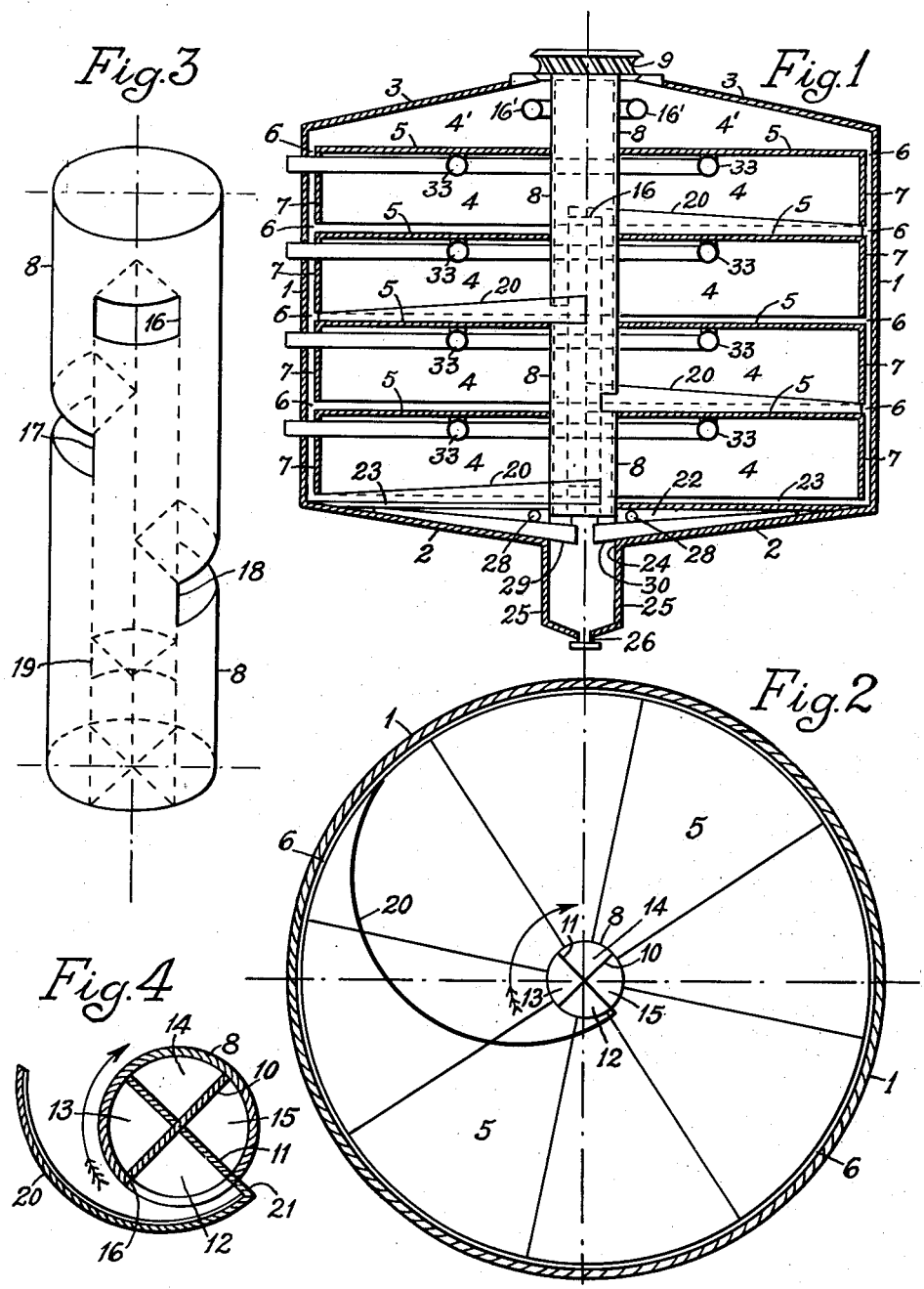
INVENTOR:
Luis M. Ibañez Rodriguez,
BY Singer, Ehlert, Stern & Carlberg,
ATTORNEYS.

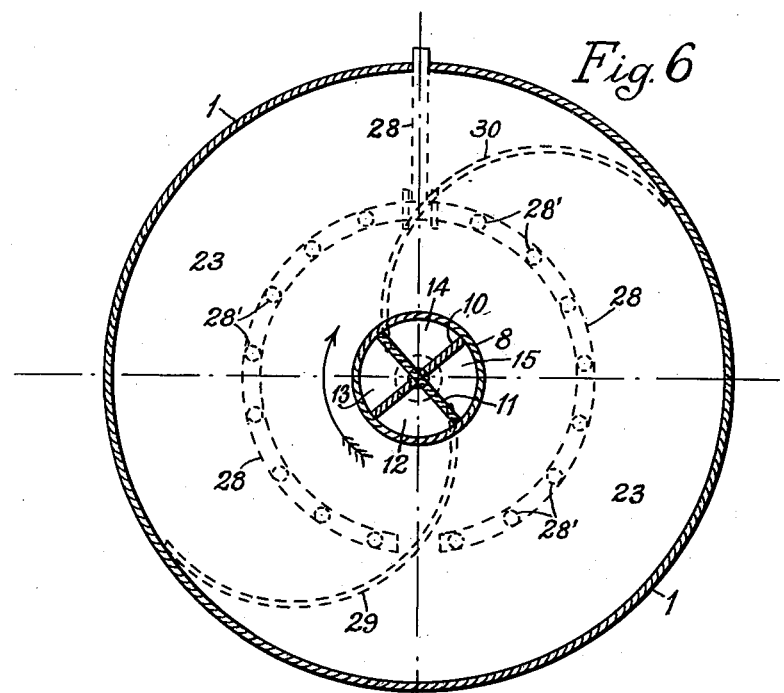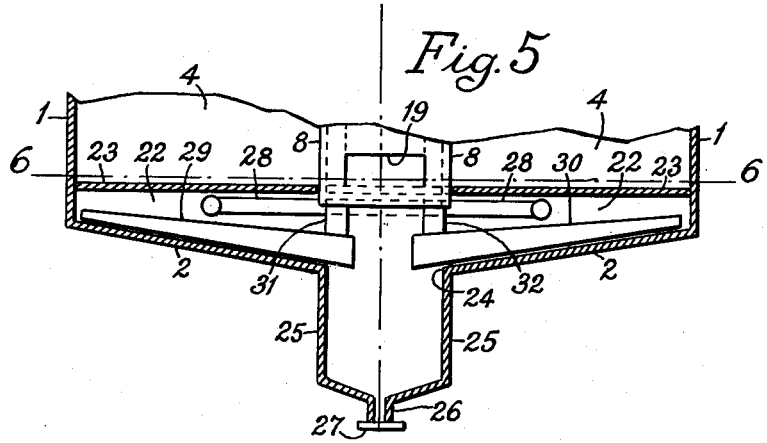

Patented June 10, 1952

2,599,782

UNITED STATES PATENT OFFICE 2,599,782

CONTINUOUS CLARIFIER

Luis M. Ibañez Rodriguez, Habana, Cuba

Application October 3, 1947, Serial No. 777,625
In Cuba December 6, 1946

2 Claims. (Cl. 210—55)

The invention relates to continuous clarifiers, particularly to a continuous clarifier especially adapted for carrying out the method of sugar juice clarification, which is the subject-matter of my co-pending United States patent application Serial No. 731,754, filed March 1st, 1947, now abandoned, and which is characterized by the fact that sugar juice is fed at the periphery of the trays and settled impurities are discharged at the centers of the trays.

The object of this invention is to provide certain improvements in clarifiers adapted for application of the aforesaid continuous clarification method, and which consists in providing a single rotatably mounted central tubular mud channel which rotatably extends through the center of all the trays and has fixedly attached thereto the various scraper mechanisms promoting the discharge of impurities from the several compartments, said tubular mud channel being longitudinally divided into as many spaced apart longitudinal channels as the clarifier has compartments, so as to allow the independent control of the discharge of impurities from each individual compartment, thus avoiding the passage of juice from one compartment to another as it occurs in the clarifiers presently in use.

Another feature of this invention is the provision at the lower portion of a continuous clarifier, of a mud concentration chamber which is separated from the rest of the clarifier by a partition occupying the entire cross-section of the clarifier and into which chamber opens the central rotatable mud channel for carrying off the mud discharged from all compartments, said chamber including a scraper mechanism that rotates along with the central tubular mud channel and also a circular tube having perforations for the withdrawal therethrough of light mud, whereby mud is withdrawn from the clarifier at a uniform density and a high degree of concentration.

A further feature of this invention consists in making the scraper mechanisms of parabolic shape and securing the same to the central rotary tubular mud channel for discharging mud from the various compartments, every two scraper mechanisms in adjacent compartments being disposed in diametrically opposed position.

The invention is described with reference to the figures of the accompanying drawings, of which:

Fig. 1 is a diametral vertical section view of a continuous clarifier embodying the improvements of this invention.

Fig. 2 is a horizontal section view of the clarifier through one of the clarifier compartments.

Fig. 3 is a perspective detailed view of the central rotary tubular mud channel for mud discharge from all compartments.

Fig. 4 is a detailed view in horizontal section through the central tubular mud channel and a scraper mechanism.

Fig. 5 is a diametral vertical sectional view of the clarifier bottom portion, showing the mud concentration chamber and the mud collector and discharge tube.

Fig. 6 is a horizontal section view on line 6—6 of Fig. 5.

Referring to Figure 1 of the drawings, a continuous clarifier is shown consisting of a cylindrical tank 1 closed below by an upwardly conical bottom portion 2 and on top by a downwardly conical cover 3. The interior of the tank 1 is divided into a top feed chamber 4' and a plurality of compartments 4 by means of horizontal trays 5 spaced apart from the peripheral wall 1 by a narrow space forming a peripherial annular channel 6 from an annular peripheral opening at the bottom of feed chamber 4' to the bottom of the clarifier, each tray 5 being provided with a depending cylindrical flange 7 the height of which is at least two-thirds the height of each compartment. All trays 5 have central openings in vertical alignment through which a central tubular mud channel 8 passing through a central opening of the top conical cover 3 and provided at its upper end with a worm gear 9 to engage thereat a worm that will receive its motion from a suitable driving mechanism which is not shown as it does not form a part of this invention, is rotatably mounted.

Preferably the peripherial annular channel 6 is of a width of 3" between the edge of each tray 5 and the peripherial wall of tank 1, whereas the inner diameter of the central tubular mud channel 8 is of 30" or ten times greater than said peripherial channel width.

The central tubular mud channel 8 is closed on top and is interiorly divided by two longitudinal right-angle crossed partitions 10 and 11 into four independent longitudinal channels 12, 13, 14 and 15 corresponding to the four compartments 4 located beneath the top feed chamber 4' which is to be supplied with juice through a semicircular tube 16' in communication with a juice tank (not shown) from which juice is fed into the top feed chamber 4'.

All four vertical sections 12, 13, 14 and 15, of central mud channel 8 are provided directly above each tray 5 with openings in the form of arcuate sectors 16, 17, 18 and 19 respectively, of which the second and third openings are diametrically opposed to each other on different levels and the fourth opening is diametrically opposed to the first also on different levels, as shown in Fig. 3.

On each tray 5, adapted to rotatably move along with the central mud channel 8 is a scraper mechanism composed of a vertical blade of parabolic shape 20 whose height gradually decreases from its inner end to its outer end and which has its forwardly moving concavity in the direction of the rotary movement indicated by the arrow in Fig. 2, each blade 20 being secured by its inner end to a short supporting arm 21 that radially projects from the periphery of the central tubular mud channel 8.

The central mud channel 8 opens at its lower end within a mud concentration chamber 22 formed by a horizontal partition 23 secured by its edge to the peripherial wall of tank 1 near the edge of the conical bottom 2, and the latter has a central opening 24 of the same diameter as the mud channel 8 and wherefrom downwardly leads the mud collecting tube 25 having a discharge opening 27 through which mud can be withdrawn and led away.

At the inner upper portion of the chamber 22 there is provided a circular tube 28 having perforations 28' at its top portion, so that the lightest liquid can be withdrawn from the mud concentrated within chamber 22 and returned to the clarifier after being mixed up with juice fed from the mills. Two opposed parabolic blades 29 and 30 are disposed in diametrically opposed position directly above the conical bottom 2, which are hangingly secured to the lower edge of tubular mud channel 8 by supporting arms 31 and 32.

The withdrawal of clarified juice from each compartment 4 is effected through circular spaced apart tubes 33 located at the upper portion of each compartment 4 at a distance central of the vertical flange of each tray and the central mud channel 8, all tubes 33 being joined together exteriorly of the clarifier in a juice collector not shown.

By means of the described structure, the juice fed to the upper chamber 4' through tube 16' passes into the lower compartments 4 through the peripherial channel 6 whose relatively reduced width respective to the diameter of the clarifier will permit such an increased feed velocity that it will prevent juice from starting to settle within said annular channel 6, but will allow a 10% of the impurities carried along by the juice to be distributed in equal proportions among the four compartments.

The mud which settles in each compartment 4 is displaced by each scraper blade toward the opening 16, 17, 18 or 19 of central mud channel 8, situated respectively adjacent and above each tray 5, through which mud is discharged within the respective channel 12, 13, 14 or 15 of the mud channel 8, and mud from all channel sections 12, 13, 14, 15 is gathered in the mud concentration chamber 22 separately from the liquid content of tank 1, said collected mud being discharged through tube 25 and opening 27 by means of a suitable pump connected to said opening.

As it will be seen from the described structure, the mud displaced from each compartment 4 is separately collected in the central mud channel 8, there being no passage of juice from one compartment to another. In existing clarifier systems including a central tube for juice feed and mud discharge from each tray, as mud passes to the central tube through the discharge opening in this tube, the suction produced by this motion near outlet tubes for clarified juice from each compartment causes a substantial amount of juice to be dragged along with the mud, thereby weakening the heavy mud traveling therein toward the central discharge column, with a resulting increase in the percentage of impurities in the feed juice passing therethrough as this mud is somewhat diluted with the juice having access thereto. That does not occur with the instant clarifier structure, for the independent sections disposed within the central rotary mud channel 8 for leading the mud displaced from each compartment 4, will prevent juice from passing from one compartment to another, and once the mud from each compartment 4 collects in its respective section of the mud channel 8, it is prevented from further contact with the juice, as each channel section leads directly to the mud concentration chamber 22 which is situated at the bottom of the clarifier and is completely isolated from the liquid content in the clarifier by horizontal partition 23.

The suction produced by the egress of clarified juice will act in the structure of this invention through the peripherial feed channel, and consequently there will be no increase in the percentage of impurities in the feed juice, for said juice does not contact the mud intake and mud discharge is completely separated from one compartment to another.

When the density of mud within the chamber 22 shall be lessened by less dense mud therein, withdrawals shall be made through perforated circular tube 28 so that the low density mud will return to the clarifier after it has been mixed up with feed juice from the mills.

The number of independent sections within the central mud channel 8 may be varied according to the number of compartments 4 provided, without thereby altering the essential character of this invention nor departing from the true spirit and scope thereof.

What I claim is:

1. A continuous clarifier comprising a vertically positioned cylindrical tank having top and bottom walls, a plurality of vertically spaced apart trays forming a top feed chamber and various clarification compartments beneath the top feed chamber and with their circumferences spaced apart from the peripheral wall of the tank to form a juice feed annular channel extending from the top feed chamber and communicating with each compartment; means for introducing liquid into said top feed chamber, a rotatably mounted vertical central tubular mud channel extending through a central opening in all of said trays and divided interiorly into as many longitudinal mud leading sections as there are compartments provided, scrapers on the trays fixedly secured to the rotatable mud channel, an outer mechanism for imparting a rotative motion to the central mud channel and all scrapers secured thereto, circularly arranged conduits extending adjacent the lower faces of the trays centrally of the compartments and provided with perforations in their upper portions for carrying off the clarified liquid, the central tubular mud channel having an opening in the peripheral wall thereof located directly above each tray to discharge the mud from each compartment separately from each other without any passage of juice from one compartment to another, a mud concentration chamber at the lower end of said tank, a horizontal partition across the tank, separating the upper portion of the tank from said mud chamber, the lower end of said rotary central tubular channel extending through said partition to discharge the mud from the individual compartments into said mud concentration chamber, and means including a discharge opening in the bottom of the tank for discharging the concentrated mud from said mud concentration chamber.

2. A continuous clarifier comprising a vertically positioned cylindrical tank having top and bottom walls, a plurality of spaced apart trays forming a top feed chamber and a plurality of clarification compartments beneath the top feed chamber and being vertically spaced with their circumferences spaced apart from the peripheral wall of the tank forming a peripheral annular channel of about 3" width for feeding juice to the various compartments from top feed chamber, means for supplying juice to be clarified to the central portion of the top feed chamber, a rotatably mounted central tubular mud channel of about 30" diameter extending through the top wall of the clarifier and passing through central openings in said trays and being divided interiorly by two longitudinal crossed partitions into a number of mud leading sections equal to the number of compartments, scrapers of parabolic shape on the trays fixedly secured to the rotatable central tubular mud channel, each mud channel section being in communication with a respective compartment through a radial sector opening formed in the peripheral wall of the central tubular mud channel and being located directly above and adjacent each tray to thus discharge mud independently from each compartment without any passage of juice from one compartment to another, a mud concentration chamber formed in said tank separated from the juice content of the tank by a horizontal partition and including the bottom wall of said tank, the lower end of said rotatable central tubular mud channel extending through said partition to discharge the mud from the individual compartments into said mud concentration chamber, circular conduits provided with perforations at their top portion and extending adjacent the lower faces of the trays at the upper central portion of the compartments for withdrawing the clarified liquid, and means including a discharge opening in the bottom wall for discharging the concentrated mud from said mud concentration chamber.

LUIS M. IBAÑEZ RODRIGUEZ.

REFERENCES CITED

The following references are of record in the file of this patent:

UNITED STATES PATENTS

| Number | Name | Date |
| --- | --- | --- |
| 915,371 | Neill | Mar. 16, 1909 |
| 1,135,997 | Dorr | Apr. 20, 1915 |
| 1,940,794 | Fisher | Dec. 26, 1933 |
| 2,253,500 | Arango | Aug. 26, 1941 |
| 2,253,878 | Weber | Aug. 26, 1941 |
| 2,536,729 | Diaz-Compain | Jan. 2, 1951 |